(12) United States Patent
Huang et al.

(10) Patent No.: US 10,671,710 B2
(45) Date of Patent: Jun. 2, 2020

(54) DIGITAL AUTHENTICATION SYSTEM

(71) Applicant: Chicony Power Technology Co., Ltd., New Taipei (TW)

(72) Inventors: Chih-Peng Huang, New Taipei (TW); Yi-Mei Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 259 days.

(21) Appl. No.: 15/861,689

(22) Filed: Jan. 4, 2018

(65) Prior Publication Data

US 2019/0042714 A1    Feb. 7, 2019

Related U.S. Application Data

(60) Provisional application No. 62/539,556, filed on Aug. 1, 2017.

(30) Foreign Application Priority Data

Nov. 23, 2017    (TW) .............................. 106140791 A

(51) Int. Cl.
  *G06F 21/31*    (2013.01)
  *H04W 12/06*    (2009.01)
  (Continued)

(52) U.S. Cl.
  CPC .............. *G06F 21/31* (2013.01); *G06F 3/044* (2013.01); *G06F 3/0488* (2013.01);
  (Continued)

(58) Field of Classification Search
  CPC .. G06F 21/31; G06F 21/36; G06F 2221/2111; G06F 3/044; G06F 3/0488;
  (Continued)

(56) References Cited

U.S. PATENT DOCUMENTS

2012/0256725 A1    10/2012    Hayashi et al.
2015/0026797 A1    1/2015    Cao
(Continued)

FOREIGN PATENT DOCUMENTS

CN    103309613 A    9/2013
CN    102501649 B    3/2014
(Continued)

*Primary Examiner* — Joseph P Hirl
*Assistant Examiner* — Thomas A Gyorfi
(74) *Attorney, Agent, or Firm* — CKC & Partners Co., LLC

(57) ABSTRACT

A digital authentication system includes an authentication device and a central computer device. The authentication device includes a signal identification module, a display, and a signal feedback unit. The central computer device includes an authentication module and a communication module. The authentication module includes at least one positioning location information, at least one authentication licensing information, and at least one time information. The communication module is configured to transmit the positioning location information and the time information to the authentication device. The authentication device is configured to activate the signal identification module according to the positioning location information and the time information. When the activated signal identification module receives an external authentication signal, the display displays an authentication result, and the signal feedback unit returns an authentication license to the central computer device.

7 Claims, 5 Drawing Sheets

(51) Int. Cl.
*G06F 3/044* (2006.01)
*G06F 3/0488* (2013.01)
*H04W 4/02* (2018.01)
*H04L 29/06* (2006.01)
*H04W 12/00* (2009.01)

(52) U.S. Cl.
CPC .......... *H04L 63/0853* (2013.01); *H04W 4/02* (2013.01); *H04W 12/00502* (2019.01); *H04W 12/00503* (2019.01); *H04W 12/06* (2013.01); *G06F 2221/2111* (2013.01)

(58) Field of Classification Search
CPC ..... H04W 12/00503; H04W 12/00502; H04W 4/02; H04W 12/06; H04L 63/0853
See application file for complete search history.

(56) References Cited

U.S. PATENT DOCUMENTS

| | | | |
|---|---|---|---|
| 2015/0293622 A1 | 10/2015 | Han et al. | |
| 2016/0035163 A1* | 2/2016 | Conrad | G07C 9/00309 340/5.61 |
| 2016/0050203 A1* | 2/2016 | Hefetz | H04L 63/18 726/7 |
| 2016/0349792 A1 | 12/2016 | Alameh et al. | |
| 2017/0236113 A1* | 8/2017 | Chitalia | G06Q 20/3224 705/44 |
| 2017/0295169 A1* | 10/2017 | Klemm | H04L 63/0492 |
| 2018/0103341 A1* | 4/2018 | Moiyallah, Jr. | H04W 4/021 |
| 2019/0020479 A1* | 1/2019 | Antipa | H04L 9/3213 |

FOREIGN PATENT DOCUMENTS

| | | |
|---|---|---|
| CN | 104320252 A | 1/2015 |
| CN | 104732629 A | 6/2015 |
| CN | 104854595 A | 8/2015 |
| CN | 104903901 A | 9/2015 |
| JP | 2005-182480 A | 7/2005 |
| JP | 2007-066212 A | 3/2007 |
| JP | 2007-102441 A | 4/2007 |
| JP | 2014-178737 A | 9/2014 |
| JP | 2015-090650 A | 5/2015 |
| TW | M506184 U | 8/2015 |

\* cited by examiner

DIGITAL AUTHENTICATION SYSTEM

RELATED APPLICATIONS

This application claims priority to U.S. Provisional Application Ser. No. 62/539,556 filed Aug. 1, 2017, and Taiwan Application Serial Number 106140791, filed Nov. 23, 2017, the disclosures of which are incorporated herein by reference in their entireties.

BACKGROUND

Technical Field

The present disclosure relates to a digital authentication system.

Description of Related Art

Currently, the usage of traditional stamps cannot be effectively managed and recorded. Most of the users merely use forms for simple usage registration, or use approval forms for simple management. However, since the usage history of traditional stamps is not recordable, the usage of stamps cannot be effectively managed and recorded simply by manual recording or approval management. As a result, the management of the usage of stamps is chaos, and brings a lot of risks and troubles to the user. Some companies have to use the official stamp outside of the office due to business needs. Since the lack of remote management, to ensure the legal and safe usage of official stamp, company must arrange a directed person to take the official stamp along with him, which is very inconvenient.

In recent years, some companies develop a smart stamp which is mainly focusing on the forming and the printing of the smart stamp. However, since the printing machinery and its control part are too complicated, the function of the smart stamp is superior to the traditional stamp but its loss of portability, practicability, and economy makes it not easy to be promoted. Therefore, the smart stamps cannot completely solve the above problems also.

SUMMARY

Accordingly, an objective of the disclosure is to provide a digital authentication system that can effectively manage and record the security of usage of a digital identification unit.

In an embodiment of the disclosure, the digital authentication system includes an authentication device and a central computer device. The authentication device includes a signal identification module, a display, and a signal feedback unit. The central computer device includes an authentication module and a communication module. The authentication module includes at least one positioning location information, at least one authentication licensing information, and at least one time information. The communication module is configured to transmit the positioning location information and the time information to the authentication device. The authentication device is configured to activate the signal identification module according to the positioning location information and the time information. When the activated signal identification module receives an external authentication signal, the display displays an authentication result, and the signal feedback unit returns an authentication license to the central computer device.

In some embodiments of the disclosure, the authentication module mentioned above includes a timing unit. The timing unit is configured to output a first timing according to receiving of a verification request. When the first timing conforms to the time information, the authentication device activates the signal identification module.

In some embodiments of the disclosure, the timing unit mentioned above is further configured to output a second timing according to receiving of another verification request. When the second timing is in accordance with the time information, the signal feedback unit returns the authentication license to the central computer device.

In some embodiments of the disclosure, the authentication module mentioned above includes a positioning unit. The positioning unit is configured to output a first location information according to receiving of a verification request. When the first location information is in accordance with the positioning location information, the authentication device activates the signal identification module.

In some embodiments of the disclosure, the positioning unit mentioned above is further configured to output a second location information according to receiving of another verification request. When the second location information is in accordance with the positioning location information, the signal feedback unit returns the authentication license to the central computer device.

In some embodiments of the disclosure, the signal identification module mentioned above includes a touch panel. When the external authentication signal received by the touch panel includes a sequence click signal and a location click signal, the signal feedback unit returns the sequence click signal and the location click signal to the central computer device.

In some embodiments of the disclosure, when the sequence click signal and the location click signal are accordance with the authentication licensing information, the central computer device transmits an authentication confirming signal to the authentication device, and the authentication result displayed by the display is an authentication success result.

In some embodiments of the disclosure, the signal identification module mentioned above includes an optical signal receiving module. When the external authentication signal received by the optical signal receiving module includes a sequence light-dark signal and/or a sequence color light signal. The signal feedback unit correspondingly returns the sequence light-dark signal and/or the sequence color light signal to the central computer device.

In some embodiments of the disclosure, when the sequence light-dark signal and/or the sequence color light signal are in accordance with the authentication licensing information. The central computer device transmits an authentication confirming signal to the authentication device, and the authentication result displayed by the display is an authentication success result.

In some embodiments of the disclosure, the authentication device mentioned above includes an authentication rules storage unit. The authentication rules storage unit is configured to receive and store the authentication licensing information transmitted by the communication module.

In some embodiments of the disclosure, the signal identification module mentioned above includes an authentication processor. When the authentication device receives the external authentication signal, and the external authentication signal is compared to be in accordance with the authentication licensing information by the authentication processor, the authentication result displayed by the display is an authentication success result, and the authentication license returned by the signal feedback unit is an authentication success license.

Accordingly, in the digital authentication system of the disclosure, while receiving the verification request, the authentication device can determine whether to activate the signal identification module by confirming whether the first timing output by the central computer device conforms to the time information, and/or by confirming whether the first location information output by the central computer device conforms to the positioning location information. Furthermore, while receiving the external authentication signal, the authentication device can further determine whether to return the authentication license to the central computer device by confirming whether the second timing output by the central computer device conforms to the time information, and/or by confirming whether the second location information output by the central computer device conforms to the positioning location information. In this way, the digital authentication system of the disclosure can effectively manage and record the security of usage of the digital identification unit.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
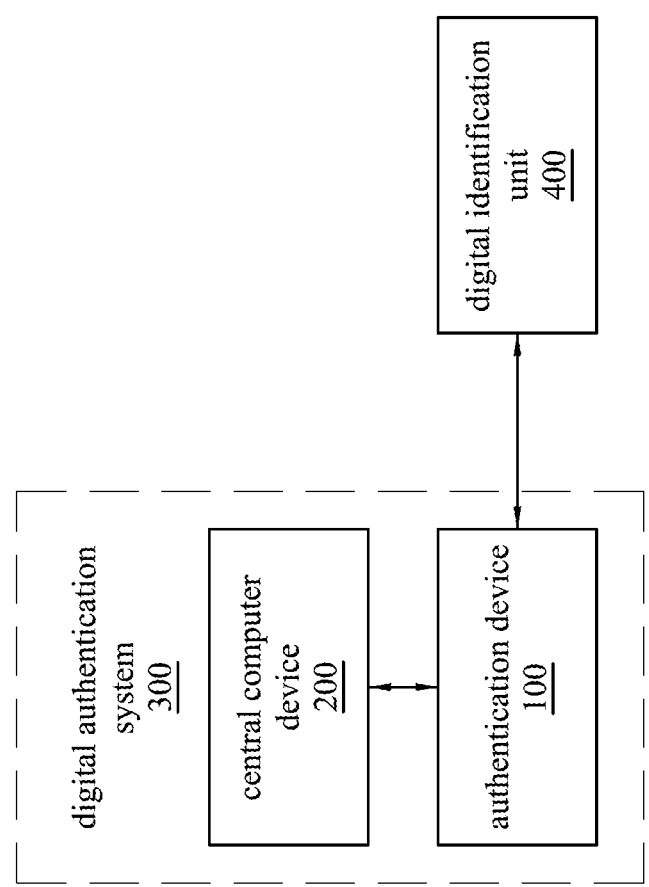
FIG. 1 is a block diagram of a digital authentication system and a digital identification unit according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a block diagram of a digital authentication system 300 and a digital identification unit 400 according to an embodiment of the disclosure. As shown in FIG. 1, in the embodiment, the digital authentication system 300 includes an authentication device 100, and a central computer device. 200. The digital authentication system 300 can verify an external authentication signal generated by the digital identification unit 400 through the authentication device 100 and the central computer device 200 to ensure the security of the usage of the digital identification unit 400. In some embodiments, the digital identification unit 400 is a smart stamp, but the disclosure is not limited in this regard. In the following, configurations and functions of internal units of the authentication device 100 and the central computer device 200, and connection relationships among the internal units will be described in detail.

Figure 2:
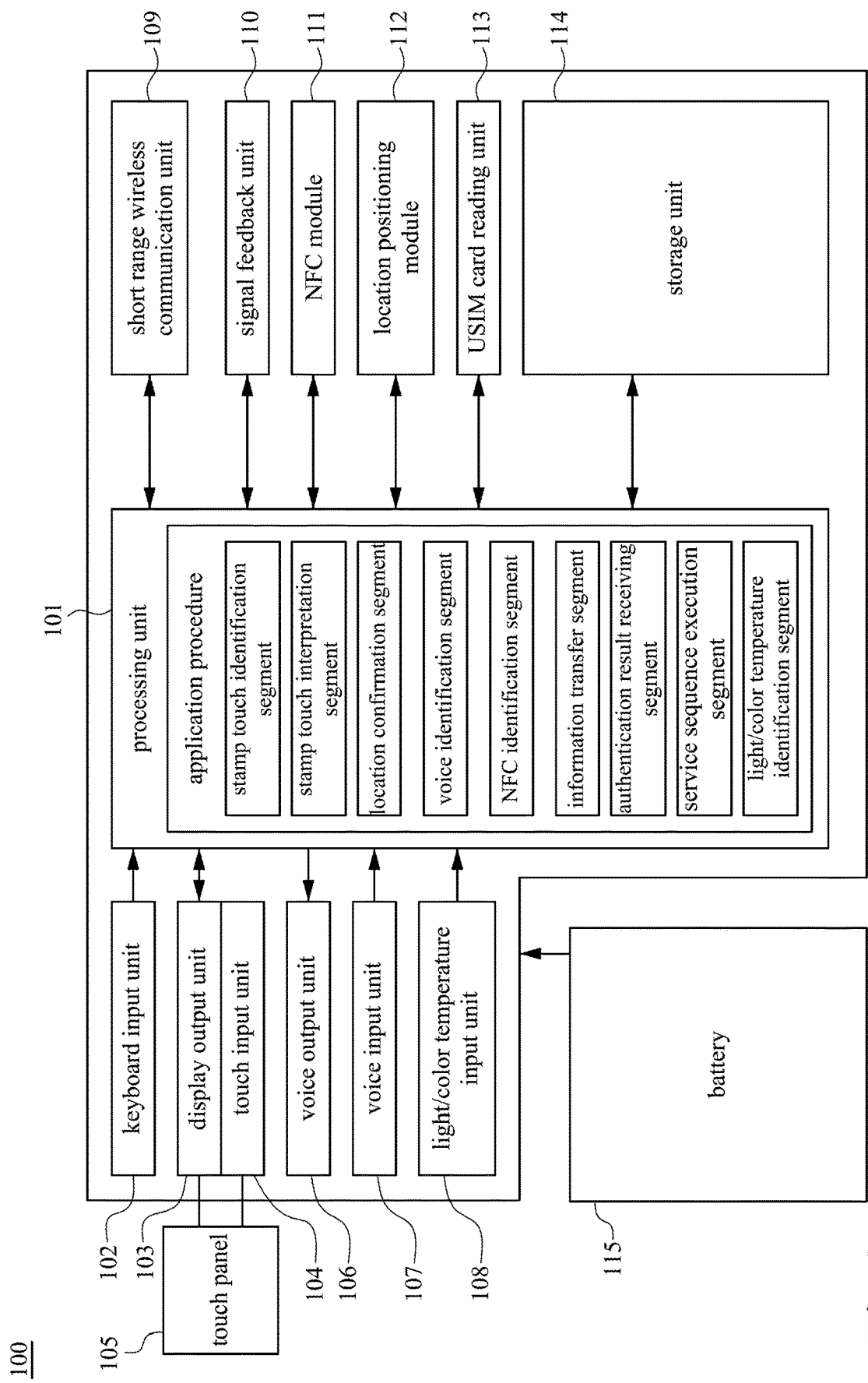
FIG. 2 is a block diagram of an authentication device included by the digital authentication system according to an embodiment of the disclosure.

Reference is made to FIG. 2. FIG. 2 is a block diagram of the authentication device 100 included by the digital authentication system 300 according to an embodiment of the disclosure.

As shown in FIG. 2, in the embodiment, the authentication device 100 includes a processing unit 101, a keyboard input unit 102, a display output unit 103, a touch input unit 104, a touch panel 105, a voice output unit 106, a voice input unit 107, a light/color temperature input unit 108, a short range wireless communication unit 109, a signal feedback unit 110, a NFC module 111, a location positioning module 112, a USIM card reading unit 113, and a storage unit 114. The authentication device 100 further includes a battery 115 for supplying power. In some embodiments, the authentication device 100 can be a portable electronic device, such as a smart phone, a tablet computer, a notebook computer, and etc., but the disclosure is not limited in this regard. In the following, the functions of the internal units of the authentication device 100 and the connection relationships among the internal units will be described in detail.

In some embodiments, the processing unit 101 is a general term for controlling operations of the authentication device 100. The processing unit 101 includes at least one processor and at least one execution memory in hardware, and is connected to each unit of the authentication device 100 through a bus. The processing unit 101 loads program codes formed in the storage unit 114 of the authentication device 100 into the execution memory via the processor and performs calculations in software. Results of the calculations are transmitted to respective constituent units in the authentication device 100 via the bus to control the operations of the authentication device 100. Also, according to needs, the processing unit 101 receives the information transmitted by the various constituent units as the required information for the calculations.

In some embodiments, the storage unit 114 is a general term of non-volatile memories formed in the authentication device 100. The storage unit 114 stores and maintains at least one program code executed by the processing unit 101 and at least one information group used by the program code. The storage unit 114 stores an application program embodied in a program code form. The application program is loaded in to the processing unit 101 to perform calculations while being driven or activated.

In some embodiments, the keyboard input unit 102 includes at least one constituent units of a key button, a key pad, and a key board formed in the authentication device 100. The keyboard input unit 102 can generate a keyboard event that drives or activates an application program. Alternatively, the keyboard input unit 102 can generate a keyboard event that activates the touch panel 105, so as to perform a touch operation of the digital identification unit 400. In some embodiments, a signal identification module of the authentication device 100 can be the keyboard input unit 102, but the disclosure is not limited in this regard.

In some embodiments, the display output unit 103 includes a display (e.g., a liquid crystal display) formed in the authentication device 100 and a driving module configured to drive the display and located inside the authentication device 100. The display output unit 103 outputs an execution screen of an application program or an authentication result.

In some embodiments, the touch input unit 104 includes a capacitive touch panel (the disclosure is not limited to a capacitive type) of a transparent material sharing the same coordinate plane with the display output unit 103, and includes a driving module configured to drive the capacitive touch panel and located inside the authentication device 100. The touch panel 105 is embodied by combining a capacitive touch panel of transparent material and the display output unit 103. In some embodiments, the signal identification module of the authentication device 100 can be a touch module consisting of the touch panel 105 and the touch input unit 104, but the disclosure is not limited in this regard.

In some embodiments, the voice output unit 106 includes a speaker formed in the authentication device 100 and a driving module configured to drive the speaker and located inside the authentication device 100. The voice input unit 107 includes a microphone formed in the authentication device 100 and a driving module configured to drive the microphone and located inside the authentication device 100. When the digital identification unit 400 has a function of outputting a voice signal, the voice input unit 107 receives the voice signal and transmits the information encoded in the voice signal to an application program. In some embodiments, the signal identification module of the authentication device 100 can be the voice input unit 107, but the disclosure is not limited in this regard.

In some embodiments, the light/color temperature input unit 108 includes a light-receiving element formed in the authentication device 100 and a driving module configured to drive light-receiving element and located inside the authentication device 100. When the digital identification unit 400 has the function of outputting a light/color temperature signal, the light/color temperature input unit 108 receives the light/color temperature signal and transmits the information encoded in the light/color temperature signal to an application program. In some embodiments, the light/color temperature input unit 108 can be one of functional units of a camera module (not shown) included by the authentication device 100. In some embodiments, the signal identification module of the authentication device 100 can be an optical signal receiving module including the light/color temperature input unit 108, but the disclosure is not limited in this regard.

In some embodiments, the signal feedback unit 110 and the short range wireless communication unit 109 are communication resources formed in the authentication device 100. In some embodiments, the signal feedback unit 110 can be a wireless network module. The wireless network module connects to wireless communication network through base stations. The short range wireless communication unit 109 connects to the wireless communication network through a short range wireless communication device or a wireless AP (Access Point) located within a short distance. In some embodiments, the short range wireless communication unit 109 is a communication unit using the Bluetooth technology, but the disclosure is not limited in this regard.

In some embodiments, the NFC module 111 transmits and receives a RF signal at a distance of about 1 cm according to a NFC specification of using a 13.56 MHz band in the ISO18000 series wireless communication specification. When a NFC chip is formed on the digital identification unit 400, the NFC module 111 can receive a RF signal transmitted by the NFC chip of the digital identification unit 400 and transmit the information encoded in the NFC-based RF signal to an application program.

In some embodiments, the authentication device 100 can also include a Beacon module (not shown). When a Beacon transmitter is formed on the digital identification unit 400, the Beacon module can receive a RF signal transmitted by the Beacon transmitter of the digital identification unit 400 and transmit the information encoded in the Beacon-based RF signal to an application program.

In some embodiments, the location positioning module 112 includes a GPS module configured to locate a moving location of the authentication device 100. The location positioning module 112 can transmit the location information of the authentication device 100 positioned by the digital identification unit 400 touching the touch panel 105 to an application program.

In some embodiments, the authentication device 100 can further include sensors such as a three-axis acceleration sensor, a gyroscope, and etc., which can transmit information about movements or the tilt postures of the authentication device 100 to an application program.

In some embodiments, the digital identification unit 400 can include a magnetic member, and the authentication device 100 can further include a magnetic induction unit to sense a click or a movement track of the magnetic member relative to the authentication device 100. In some embodiments, the magnetic induction unit is a Hall sensor, but the disclosure is not limited in this regard.

Figure 3:
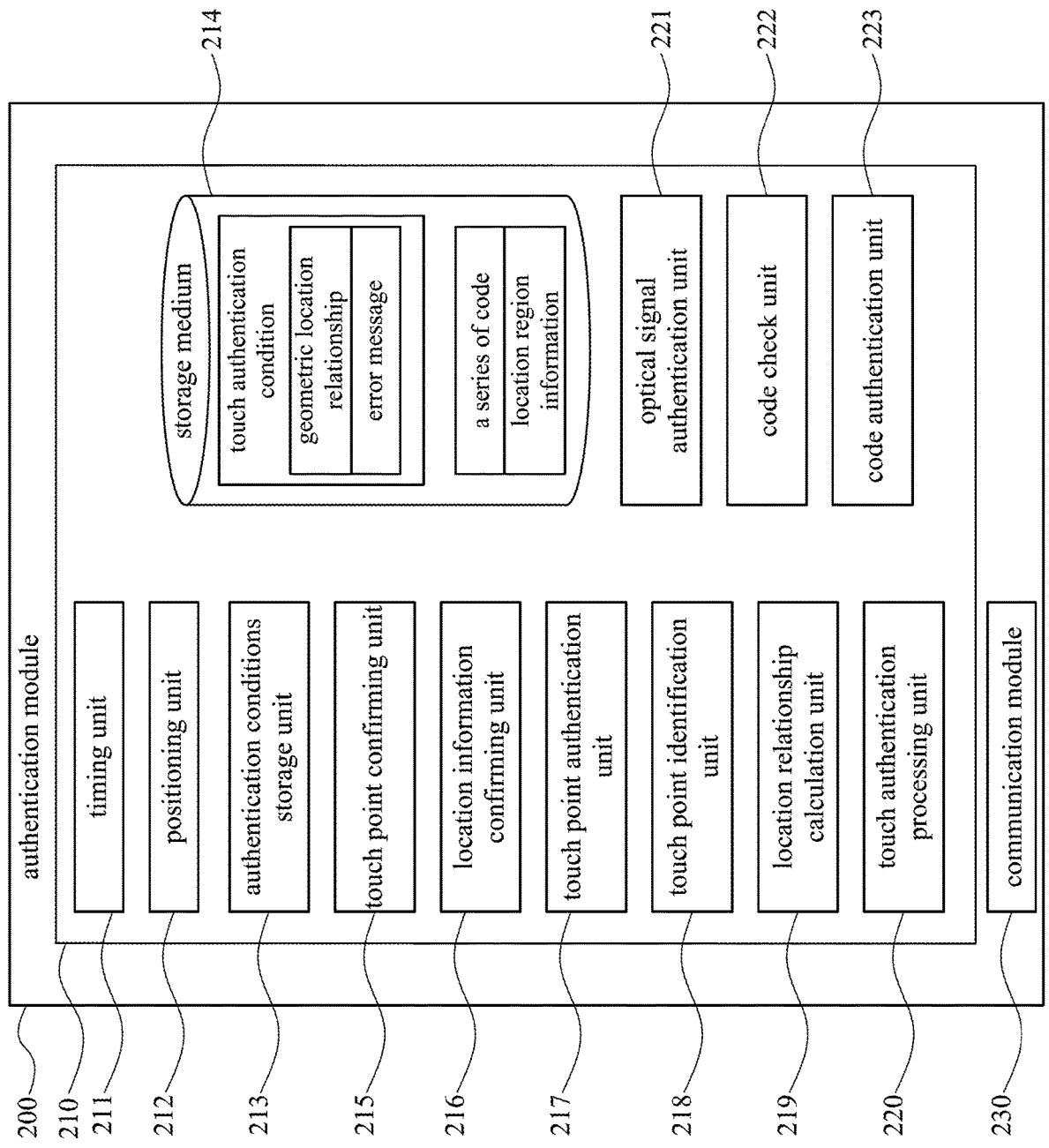
FIG. 3 is a block diagram of a central computer device included by the digital authentication system according to an embodiment of the disclosure.

Reference is made to FIG. 3. FIG. 3 is a block diagram of the central computer device 200 included by the digital authentication system 300 according to an embodiment of the disclosure.

As shown in FIG. 3, in the embodiment, the central computer device 200 includes an authentication module 210 and a communication module 230. The authentication module 210 includes a timing unit 211, a positioning unit 212, an authentication condition storage unit 213, a storage medium 214, a touch point confirming unit 215, a location information confirming unit 216, a touch point authentication unit 217, a touch point identification unit 218, a location relationship calculation unit 219, a touch authentication processing unit 220, an optical signal authentication unit 221, a code check unit 222, and a code authentication unit 223. In the following, the functions of the units included in the central computer device 200 and the connection relationships among the units will be described in detail.

In some embodiments, the communication module 230 is configured to receive an authentication request, a verification request, and an external authentication signal transmitted by the authentication device 100.

Figure 4:
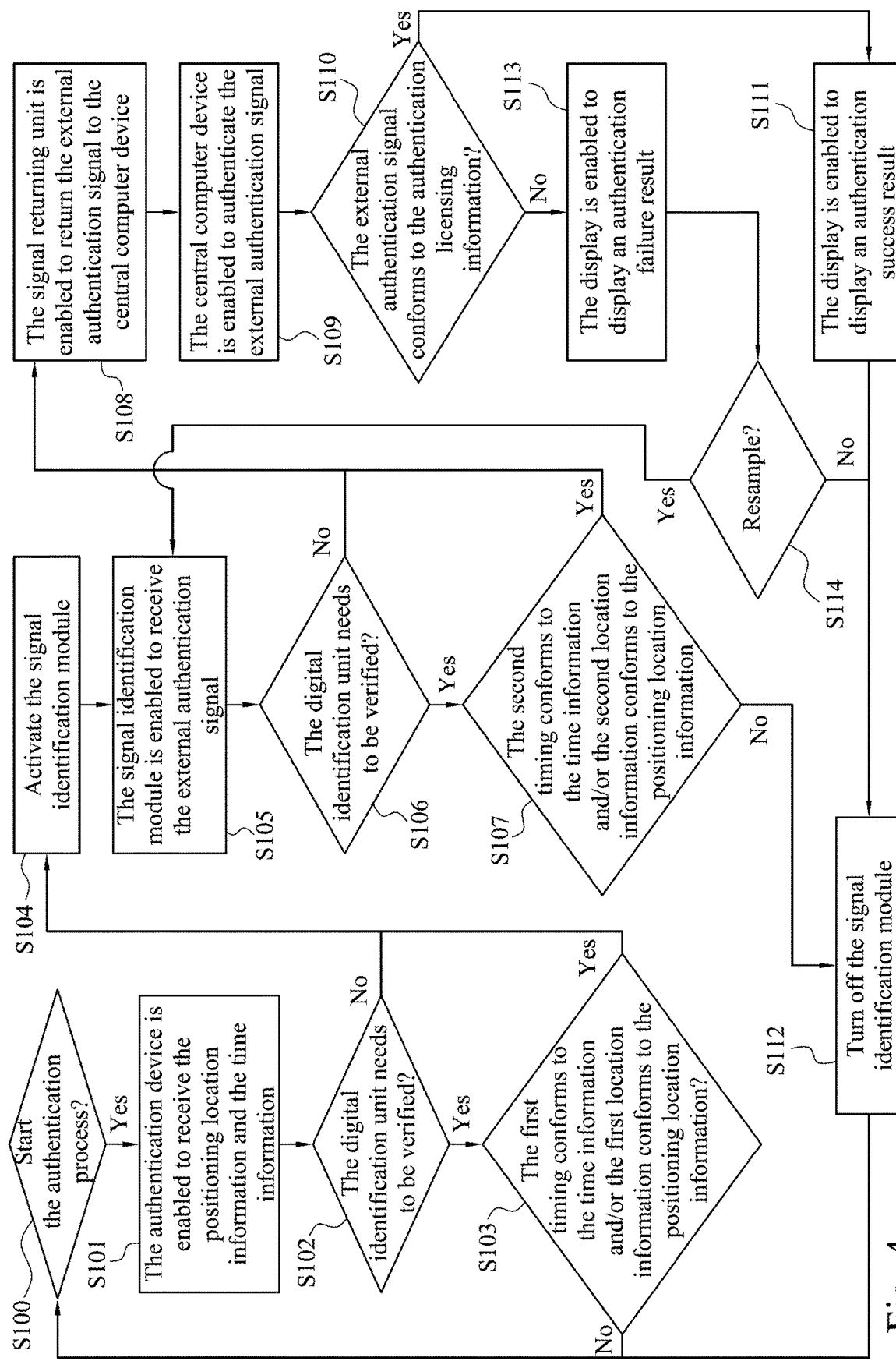
FIG. 4 is a flow chart of a digital authentication method according to an embodiment of the disclosure.

In some embodiments, the timing unit 211 is configured to output a first timing according to receiving of the verification request, and the timing unit 211 is further configured to output a second timing according to receiving of another verification request. Applications of the first timing and the second timing will be described in detail in a digital authentication method as shown in FIG. 4.

In some embodiments, the positioning unit 212 is configured to output a first location information according to receiving of the verification request, and the timing unit 211 is further configured to output a second location information according to receiving of another verification request. Applications of the first location information and the second location information will be described in detail in the digital authentication method as shown in FIG. 4.

In some embodiments, the external authentication signal can include a touch identification information of component values of N touch points touched by the touch panel 105. In some embodiments, the touch identification information can include a sequence click signal and location click signals related to the N touch points. The touch point confirming unit 215 is configured to confirm the component values corresponding to the component values included in the touch identification information. The location information confirming unit 216 is configured to confirm the location information of the authentication device 100 by using the authentication request, the verification request, and the external authentication signal.

In some embodiments, the touch point authentication unit 217 is configured to interpret the order relationship and the mutual location relationship among the N touch points by using the component values included in the touch identification information (i.e., to interpret the sequence click signal and the location click signals), and is configured to authenticate the sequence click signal and the location click signals respectively by using sequence click rule information and location click rule information.

In some embodiments, the touch point identification unit 218 is configured to interpret the component values through a separated region information related to the N separated regions, and is configured to identify a designated touch point formed at a designated location of a designated region. The location relationship calculation unit 219 is configured to calculate the geometric location relationship of authenticated objects between the identified designated touch point and each of the N touch points. The touch authentication processing unit 220 is configured to compare and authenticate the calculated geometric location relationship of authenticated objects between the identified designated touch point and each of the N touch points with the geometric location relationship of touch authentication conditions.

In some embodiments, the external authentication signal can include an optical identification information of component values of N optical signals received by the light/color temperature input unit 108. In some embodiments, light identification information can include a sequence light-dark signal and/or a sequence color light signal related to the N optical signals.

In some embodiments, the optical signal authentication unit 221 is configured to interpret the order relationship among the N optical signals by using the component values included in the optical identification information (i.e., to interpret the sequence light-dark signal and the sequence color light signal), and is configured to authenticate the interpreted order relationship by using sequence light-dark rule information and sequence color light rule information in the authentication licensing information.

In some embodiments, if the touch identification information includes a unique code or a one-time code identified by voice or NFC, the code check unit 222 is configured to confirm the unique code or the one-time code included in the touch identification information. The code authentication unit 223 is configured to authenticate the unique code or the one-time code by using the touch authentication conditions. The touch authentication processing unit 220 combines a result of authenticating the component value and a result of authenticating the unique code or the one-time code to generate an authentication result. The generated authentication result is transmitted to a reverse direction of a path of receiving the component value by the touch authentication processing unit 220.

In some embodiments, the authentication condition storage unit 213 is configured to map the information including the generated geometric location relationship, error messages (e.g., actual measurement error message or design error message), and location region information (e.g., address information, geographical information, etc.) according to the touch authentication conditions of each digital identification unit 400 and a series of codes of each digital identification unit 400, and the information mapped by the authentication condition storage unit 213 is stored in the designated storage medium 214. In addition, the storage medium 214 further stores the positioning location information corresponding to a plurality of places, the authentication licensing information including the sequence click rule information and the location click rule information, the authentication licensing information including the sequence light-dark rule information and/or the sequence color light rule information, and at least one time information.

Reference is made to FIG. 4. FIG. 4 is a flow chart of the digital authentication method according to an embodiment of the disclosure. As shown in FIG. 4, in the embodiment, the digital authentication method includes steps S100-S114. In the following, the digital authentication method of the embodiment will be described in detail accompanying with the digital authentication system 300 and the digital identification unit 400 shown in FIG. 1.

In the step S100, whether to start an authentication procedure is determined. If the judgment result in step S100 is yes, step S101 is then executed. In some embodiments, the authentication procedure is started based on receiving of the authentication request. In some embodiments, while receiving the authentication request, the signal feedback unit 110 can synchronously transmit the authentication request to the central computer device 200. In addition, the authentication request includes the current location information of the authentication device 100 generated by the location positioning module 112.

In step S101, the authentication device 100 is enabled to receive positioning location information and time information. In some embodiments, while receiving the authentication request, the central computer device 200 will confirm the location information of the authentication device 100 by using the location information confirming unit 216 according to the authentication request, and transmits the positioning location information and time information stored in the storage medium 214 and corresponding to the location information of the authentication device 100 to the authentication device 100 through the communication module 230.

In some embodiments, the positioning location information and the time information of a plurality of places stored in the storage medium 214 of the central computer device 200 can be stored in the storage unit 114 of the authentication device 100 in advance. Therefore, step S101 can be omitted optionally.

Step S102 is then executed after step S101. In step S102, whether the digital identification unit 400 needs to be authenticated is determined. If the judgment result in step S102 is yes, step S103 is then executed. If the judgment result in step S102 is no, step S104 is executed.

In some embodiments, step S102 can be optionally omitted. Therefore, in some embodiments, step S103 is executed right after step S100 or step S101 (if exists). In some other embodiments, step S104 is executed right after step S100 or step S101 (if there exists).

In step S103, whether a first timing conforms to a time information and/or whether a first location information conforms to a positioning location information is determined. If the judgment result in step S103 is yes, step S104 is then executed. If the judgment result in step S103 is no, step S100 is executed again.

In some embodiments, the timing unit 211 of the authentication module 210 is configured to output the first timing according to receiving of the verification request, and is configured to transmit the first timing to the authentication device 100 by the communication module 230. In some embodiments, when the first timing conforms to the time information, step S104 is executed. For example, the information stored in the time information is a predetermined time point after the central computer device 200 receives the authentication request, and the first timing is a time point when the central computer device 200 receives the verification request. If the time point does not exceed the predetermined time point, the first timing conforms to the time information. If the time point exceeds the predetermined time point, the first timing does not conform to the time information. In this way, the digital authentication method of the embodiment can execute the subsequent procedure of activating the signal identification module (i.e., step S104) only when the verification request is received within the predetermined time after the authentication device 100 receives the authentication request. Therefore, the security of the usage of the digital identification unit 400 can be effectively managed in terms of time.

In some embodiments, the positioning unit 212 of the authentication module 210 is configured to output the first location information according to receiving of the verification request, and is configured to transmit the first location information to the authentication device 100 by the communication module 230. In some embodiments, when the first location information conforms to the positioning location information, step S104 is executed. For example, the information stored in the positioning location information is a predetermined location region corresponding to the authentication request, and the first location information is a location of the authentication device 100 when the central computer device 200 receives the verification request. If the location is within the predetermined location region, the first location information conforms to the positioning location information. If the location is outside the predetermined location region, the first location information does not conform to the positioning location information. In this way, the digital authentication method of the embodiment can execute the subsequent procedure of activating the signal identification module (i.e., step S104) only when the verification request is received within the predetermined location region after the authentication device 100 receives the authentication request. Therefore, the security of the usage of the digital identification unit 400 can be effectively managed in terms of location.

In some embodiments, only when the first timing and the first location information respectively conform to the time information and the positioning location information, step S104 is executed. In this way, the digital authentication method of the embodiment can execute the subsequent procedure of activating the signal identification module (i.e., step S104) only when the verification request is received within the predetermined time and the predetermined location region after the authentication device 100 receives the authentication request. Therefore, the security of the usage of the digital identification unit 400 can be effectively managed in terms of time and location.

In some embodiments, step S103 can be optionally omitted. In some embodiments, step S104 is executed right after step S100, step S101 (if exists), or step S102 (if exists).

In step S104, a signal identification module is activated. In some embodiments, the authentication device 100 can activate the signal identification module by using the processing unit 101. As described above, the signal identification module of the authentication device 100 can be the keyboard input unit 102, the voice input unit 107, the optical signal receiving module including the light/color temperature input unit 108, or the touch identification module including the touch panel 105 and the touch input unit 104.

Step S105 is executed after step S104. In step S105, the signal identification module is enabled to receive the external authentication signal.

Step S106 is executed after step S105. In step S106, whether the digital identification unit 400 needs to be authenticated is determined. If the judgment result in step S106 is yes, step S107 is executed. If the judgment result in step S106 is no, step S108 is executed.

In some embodiments, step S106 can be omitted optionally. Therefore, in some embodiments, step S107 is executed right after step S105. In some other embodiments, step S108 is executed right after step S105.

In step S107, whether a second timing conforms to the time information and/or whether a second location information conforms to the positioning location information is determined. If the judgment result in step S107 is yes, step S108 is executed. If the judgment result in step S107 is no, step S112 is executed.

In some embodiments, the timing unit 211 of the authentication module 210 is configured to output the second timing according to receiving of another verification request, and is configured to transmit the second timing to the authentication device 100 by the communication module 230. In some embodiments, when the second timing conforms to the time information, step S108 is executed. For example, the information stored in the time information is a predetermined time point after the central computer device 200 receives the authentication request, and the second timing is a time point when the central computer device 200 receives the pre-mentioned another verification request. If the time point does not exceed the predetermined time point, the second timing conforms to the time information. If the time point exceeds the predetermined time point, the second timing does not conform to the time information. In this way, the digital authentication method of the embodiment can execute the subsequent procedure of returning the external authentication signal to the central computer device 200 only when the pre-mentioned another verification request is received within the predetermined time after the authentication device 100 receives the authentication request. Therefore, the security of the usage of the digital identification unit 400 can be effectively managed in terms of time.

In some embodiments, the positioning unit 212 of the authentication module 210 is configured to output the second location information according to receiving of another verification request, and is configured to transmit the second location information to the authentication device 100 by the communication module 230. In some embodiments, when the second location information conforms to the positioning location information, step S108 is executed. For example, the information stored in the positioning location information is a predetermined location region corresponding to the authentication request, and the second location information is a location of the authentication device 100 when the central computer device 200 receives the pre-mentioned another verification request. If the location is within the predetermined location region, the second location information conforms to the positioning location information. If the location is outside the predetermined location region, the second location information does not conform to the positioning location information. In this way, the digital authentication method of the embodiment can execute the subsequent procedure of returning the external authentication signal to the central computer device 200 only when the pre-mentioned another verification request is received within the predetermined location region after the authentication device 100 receives the authentication request. Therefore, the security of the usage of the digital identification unit 400 can be effectively managed in terms of location.

In some embodiments, only when the second timing and the second location information respectively conform to the time information and the positioning location information, step S108 is executed. In this way, the digital authentication method of the embodiment can execute the subsequent procedure of returning the external authentication signal to the central computer device 200 only when the pre-mentioned another verification request is received within the predetermined time and the predetermined location region after the authentication device 100 receives the authentication request. Therefore, the security of the usage of the digital identification unit 400 can be effectively managed in terms of time and location.

In some embodiments, step S107 can be optionally omitted. In some embodiments, step S108 can be executed right after step S105 or step S106 (if exists).

In step S108, the signal feedback unit 110 is enabled to return the external authentication signal to the central computer device 200.

In some embodiments, the external authentication signal can include the touch identification information of the component values of N touch points touched by the touch panel 105, or include the optical identification information of the component values of N optical signals received by the light/color temperature input unit 108, but the disclosure is not limited in this regard.

Step S109 is executed after step S108. In step S109, the central computer device 200 is enabled to authenticate the external authentication signal. In some embodiments, the central computer device 200 authenticates the external authentication signal by using the authentication module 210.

Step S110 is executed after step S109. In step S110, whether the external authentication signal conforms to the authentication licensing information is determined. If the judgment result in step S110 is yes, step S111 is executed. If the judgment result of S110 is no, step S113 is executed.

In some embodiments, the touch identification module consisting of the touch panel 105 and the touch input unit 104 serves as the signal identification module of authentication device 100. In some embodiments, the central computer device 200 uses the touch point authentication unit 217 to determine whether the sequence click signal and the location click signals interpreted by the touch point authentication unit 217 conform to the sequence click rule information and the location click rule information in the authentication licensing information. If the judgment result is yes, step S111 is then executed.

In some embodiments, the optical signal receiving module including the light/color temperature input unit 108 serves as the signal identification module of authentication device 100. In some embodiments, the central computer device 200 uses the optical signal authentication unit 221 to determine whether the sequence light-dark signal and/or the sequence color light signal interpreted by the optical signal authentication unit 221 conform to the sequence light-dark rule information and/or the sequence color light rule information. If the judgment result is yes, step S111 is then executed.

In step S111, the display is enabled to display the success result. Step S112 is executed after step S111.

In some embodiments, when the sequence click signal and the location click signals conform to the sequence click rule information and the location click rule information in the authentication licensing information, the central computer device 200 transmits the authentication confirming signal to the authentication device 100 by using the communication module 230, and the authentication result displayed by the display of the authentication device 100 is an authentication success result.

In some embodiments, when the sequence light-dark signal and/or the sequence color light signal conform to the sequence light-dark rule information and/or sequence color light rule information in the authentication licensing information, the central computer device 200 transmits the authentication confirming signal to the authentication device 100 by using the communication module 230, and the authentication result displayed by the display of the authentication device 100 is an authentication success result.

In step S112, the signal identification module is turned off.

In step S113, the display is enabled to display an authentication failure result.

In some embodiments, when the sequence click signal and the location click signals do not conform to the sequence click rule information and the location click rule information in the authentication licensing information, the central computer device 200 transmits the authentication confirming signal to the authentication device 100 by using the communication module 230, and the authentication result displayed by the display of the authentication device 100 is the authentication failure result.

In some embodiments, when the sequence light-dark signal and/or the sequence color light signal do not conform to the sequence light-dark rule information and the sequence color light rule information in the authentication licensing information, the central computer device 200 transmits the authentication confirming signal to the authentication device 100 by using the communication module 230, and the authentication result displayed by the display of the authentication device 100 is the authentication failure result.

Step S114 is executed after step S113. In step S114, whether to resample is determined. If the judgment result in step S114 is yes, step S105 is executed again. If the judgment result in step S114 is no, step S112 is executed.

Figure 5:
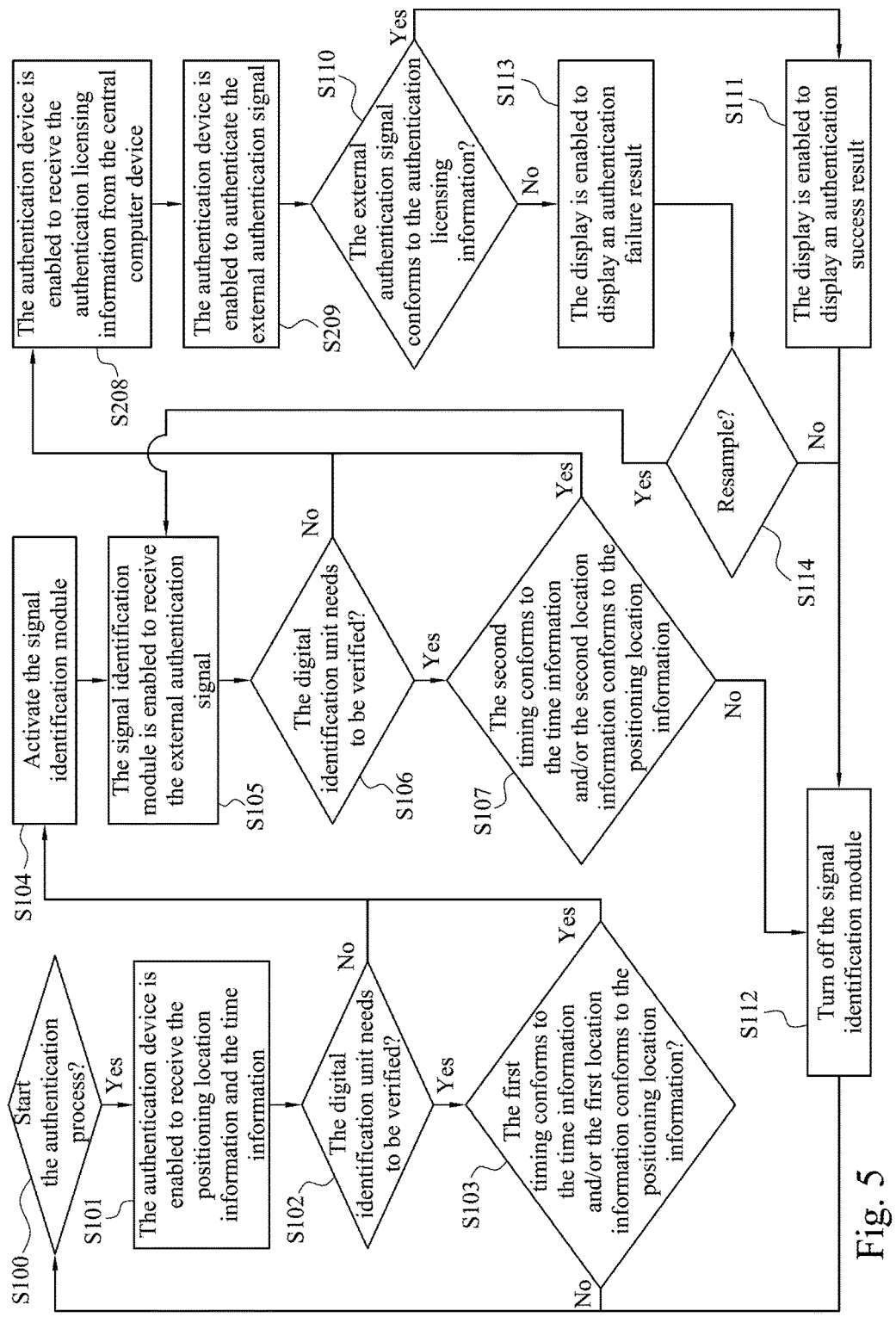
FIG. 5 is a flow chart of a digital authentication method according to another embodiment of the disclosure.

Reference is made to FIG. 5. FIG. 5 is a flow chart of a digital authentication method according to another embodiment of the disclosure. A difference between the digital authentication method of the present embodiment and the digital authentication method shown in FIG. 4 is that the digital authentication method of the present embodiment replaces step S108 and step S109 with step S208 and step S209 respectively. Descriptions related to the rest of the same steps can be referred to the above similar descriptions and will not be repeated here for simplicity. In the following, step S208 and step S209 in the digital authentication method of the present embodiment will be described in detail.

In step S208, the authentication device 100 is enabled to receive the authentication licensing information from the central computer device 200. In some embodiments, the authentication device 100 uses the storage unit 114 to receive and store the authentication licensing information transmitted by the communication module 230. That is, the storage unit 114 can serve as an authentication rules storage unit of the authentication device 100.

In step S209, the authentication device 100 is enabled to authenticate the external authentication signal. In some embodiments, the authentication device 100 uses the processing unit 101 to determine whether the external authentication signal conforms to the authentication licensing information. That is, the processing unit 101 can serve as an authentication processor of the authentication device 100.

Apparently, from the above description, in the digital authentication system of the disclosure, while receiving the verification request, the authentication device can determine whether to activate the signal identification module by confirming whether the first timing output by the central computer device conforms to the time information, and/or by confirming whether the first location information conforms to the positioning location information. Furthermore, while receiving the external authentication signal, the authentication device can further determine whether to return the authentication license to the central computer device by confirming whether the second timing output by the central computer device conforms to the time information, and/or by confirming whether the second location information conforms to the positioning location information. In this way, the digital authentication system of the disclosure can effectively manage and record the security of the usage of the digital identification unit in terms of time and location.

Though the disclosure has been described by the above embodiments, the disclosed embodiments are not limited thereof. Any person skilled in the art can make various changes and modifications without departing from the spirit and the scope of the disclosure. Therefore, the protective scope of the disclosure shall be the scope of the claim as attached.

What is claimed is:

1. A digital authentication system, comprising:
   an authentication device comprising a signal identification module, a display, and a signal feedback unit; and
   a central computer device comprising an authentication module and a communication module, the authentication module comprising at least one positioning location information, at least one authentication licensing information, and at least one time information, the communication module being configured to transmit the positioning location information and the time information to the authentication device,
   wherein the authentication device is configured to activate the signal identification module according to the positioning location information and the time information,
   wherein when the activated signal identification module receives an external authentication signal, the display displays an authentication result, and the signal feedback unit returns an authentication license to the central computer device,
   wherein the authentication module comprises a timing unit configured to output a first timing according to receiving of a verification request, and when the first timing is in accordance with the time information, the authentication device activates the signal identification module,
   wherein the timing unit is further configured to output a second timing according to receiving of another verification request, and when the second timing is in accordance with the time information, the signal feedback unit returns the authentication license to the central computer device,
   wherein the authentication module comprises a positioning unit configured to output a first location information according to receiving of a verification request, and when the first location information is in accordance with the positioning location information, the authentication device activates the signal identification module, and
   wherein the positioning unit is further configured to output a second location information according to receiving of another verification request, and when the second location information is in accordance with the positioning location information, the signal feedback unit returns the authentication license to the central computer device.

2. The digital authentication system of claim 1, wherein the signal identification module comprises a touch panel, and when the external authentication signal received by the touch panel comprises a sequence click signal and a location click signal, the signal feedback unit returns the sequence click signal and the location click signal to the central computer device.

3. The digital authentication system of claim 2, wherein when the sequence click signal and the location click signal are in accordance with the authentication licensing information, the central computer device transmits an authentication confirming signal to the authentication device, and the authentication result displayed by the display is an authentication success result.

4. The digital authentication system of claim 1, wherein the signal identification module comprises an optical signal receiving module, and when the external authentication signal received by the optical signal receiving module comprises a sequence light-dark signal and/or a sequence color light signal, the signal feedback unit correspondingly returns the sequence light-dark signal and/or the sequence color light signal to the central computer device.

5. The digital authentication system of claim 4, wherein when the sequence light-dark signal and/or the sequence color light signal are in accordance with the authentication licensing information, the central computer device transmits an authentication confirming signal to the authentication device, and the authentication result displayed by the display is an authentication success result.

6. The digital authentication system of claim 1, wherein the authentication device comprises an authentication rules storage unit configured to receive and store the authentication licensing information transmitted by the communication module.

7. The digital authentication system of claim 6, wherein the signal identification module comprises an authentication processor, and when the authentication device receives the external authentication signal and the external authentication signal is compared to be in accordance with the authentication licensing information by the authentication processor, the authentication result displayed by the display is an authentication success result and the authentication license returned by the signal feedback unit is an authentication success license.

* * * * *